March 18, 1952 J. T. FOUFOUNIS 2,589,363
SELF-POSING DEVICE WITH ADJUSTABLE
PERISCOPIC VIEW-FINDER
Filed Oct. 1, 1947 3 Sheets-Sheet 3

Inventor:
Jean Théodore Foufounis
by: J Delattre-Seguy
Attorney

Patented Mar. 18, 1952

2,589,363

UNITED STATES PATENT OFFICE 2,589,363

SELF-POSING DEVICE WITH ADJUSTABLE PERISCOPIC VIEW FINDER

Jean Theodore Foufounis, Paris, France

Application October 1, 1947, Serial No. 777,143
In France October 4, 1946

7 Claims. (Cl. 88—74)

The object of this invention is to provide a self-view-finder for use in photography or cinematography, said device enabling the user to photograph himself in any position relative to the camera, after having chosen the position which suits him and judged the effect produced in the view-finder.

Other objects of this invention are to provide:

A view-finder which facilitates obtaining light-tightness and dust-tightness and which permits the use of reflecting mirrors;

A view-finder which enables the user to turn beyond a side-face position and even to photograph himself from the rear, at any angle (certain women may for example wish to photograph their hair from various angles);

A view-finder which gives a real aerial image of sufficient luminosity, only by use of purely optic devices.

Said self view-finder comprises a periscopic device combined with a panoramic telescope.

Further features of the invention will be apparent from the following description with reference to the accompanying drawings, which are given solely by way of example and in which.

Figure 1:
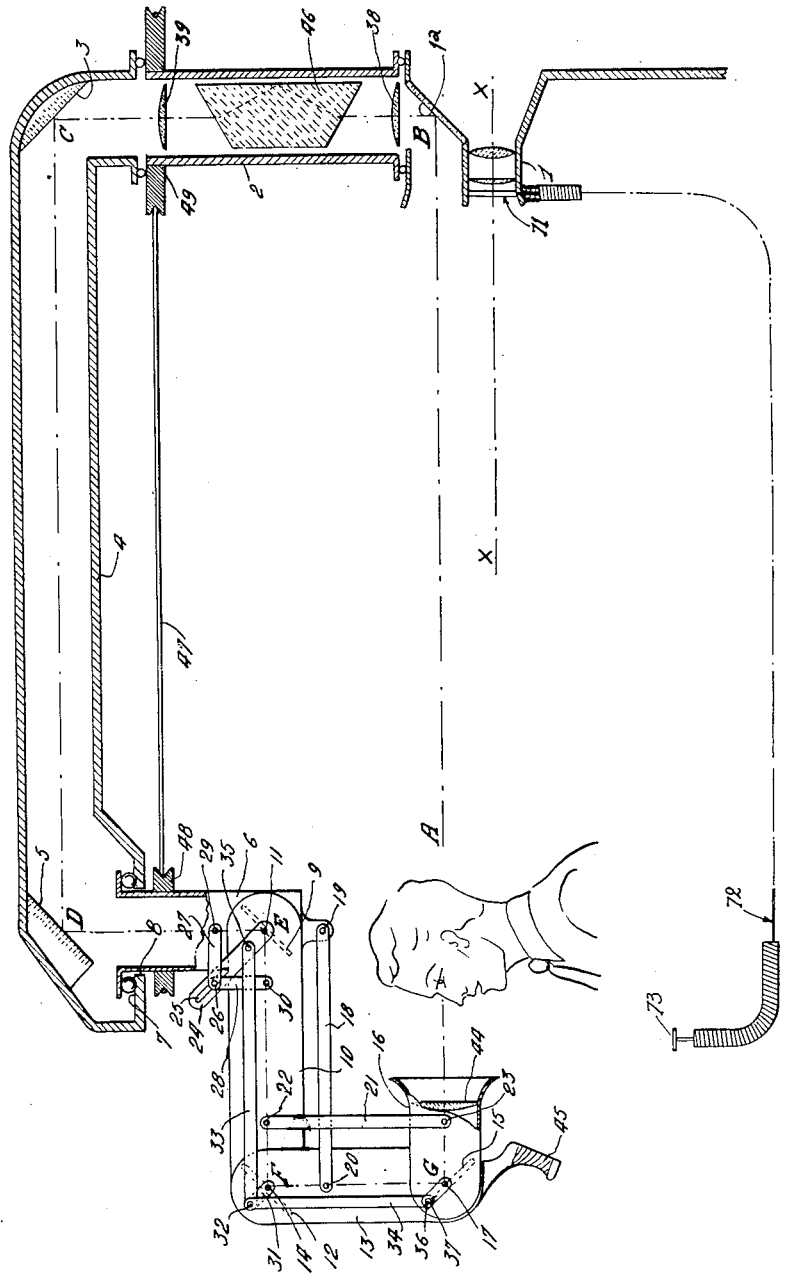
Fig. 1 is an elevational view, with parts in section, of a view-finder for self-photography according to the invention.

According to the embodiment shown in Fig. 1, A designates the subject who wishes to photograph himself for example from behind, and I the camera objective whose optical axis is XX. Immediately adjacent said camera objective I and along a parallel axis AB the optical axis for the incoming rays of the self-photographing view-finder device is located. The axes XX and AB are sufficiently close together for the error due to parallax to be considered as negligible. A first mirror 1ª reflects vertically said incoming rays inside a first tubular element 2, the axis of said reflected rays being represented at BC. A second mirror 3 reflects said rays along an axis CD inside a second light-tight stationary tubular element 4, the length of which is substantially equal to the distance between the subject A and the objective I. A third stationary mirror 5 reflects said rays at D, vertically downwards along DE, inside a third vertical tube 6 rotatably mounted about the vertical axis DE on a bearing surface 7 provided in the tube 4 around the orifice 8 through which the tube 6 emerges downwardly. At E a fourth mirror 9 reflects the rays along optical axis EF, inside a fourth tube 10. Said tube 10 is pivotally mounted about a horizontal pivot 11 passing through E, on the vertical tube 6. A fifth mirror 12 reflects the rays at F and downwards along optical axis FG inside a fifth tube 13 which is pivotally mounted on the tube 10 about a pivot 14 parallel to the pivot 11 and passing through F. Finally, a sixth mirror 15 reflects the rays at G towards the subject A, along the optical axis GA of an eye-piece tube 16 which is pivotally mounted on the tube 13 about a pivot 17 parallel to the pivots 11 and 14 and passing through G.

Linkage devices are provided so that whatever be the oscillations of the intermediate tube 10 on the tube 6: on the one hand the tube 13 remains parallel to the tube 6 (FG parallel to DE) and the tube 16 remains parallel to the tube 10 (GA parallel to EF), and on the other hand the perpendiculars to the mirrors 9, 12 and 15 remain constantly directed along the bisectors of the angles DEF, EFG and FGA.

These results are obtained in the following manner:

A link 18 is pivotally connected at 19 and 20 to the tubes 6 and 13 in such a manner that the parallel pivots 11 and 14 form with pivots 19 and 20 a deformable parallelepiped, as appears from Fig. 1; consequently the tube 13 remains constantly parallel to the tube 6;

Similarly, a link 21 is pivoted at 22 and 23 on the tubes 10 and 16, in such a manner that pivots 14, 17, 22 and 23 form another deformable parallelepiped, as also appears from Fig. 1; the tube 16 therefore definitely remains parallel to the tube 10;

On the other hand, mirror 9 is pivotally mounted within tube 6 on the same pivot 11 that connects tubes 6 and 10, and said mirror is rigidly secured to an arm 24 provided with a longitudinal opening 25 in which slides the pivot 26 connecting together the two equal legs 27 and 28 of a shear-like device, said legs being pivotally connected at their other ends at 29 and 30 to the tubes 6 and 10; therefore whatever be the angular position of the tube 10 relatively to the tube 6, the perpendicular to the mirror 9 remains coincident with the bisector of the angle DEF;

Finally the mirror 12, which is pivoted about the pivot 14, likewise carries a rigid arm 31 on which two links 33 and 34 are pivotally mounted about a pivot 32. The link 33 is pivoted at 35 on the arm 24 secured to the mirror 9 and the link 34 is pivoted at 36 on an arm 37 rigidly secured to the mirror 15. The pivots 32, 35 and 36 are arranged in such a manner that they form two deformable parallelograms with the pivots 11, 14 and 17 of the mirrors 9, 12 and 15; consequently, the mirrors 12 and 15 follow the movements of the mirror 9 when the tube 10 swings relatively to the tube 6, and in such a manner that their perpendiculars remain constantly coincident with the bisectors of the angles EFG and FGA.

Under these conditions, in whatever direction the tube 6 is turned about the axis DE, the inclination of the tube 10 about the pivot 11 may be varied, which makes it possible to place mirror 17 in any desired spatial position about the user and consequently for the user to assume any pose relative to the camera objective (oblique, side-face, rear, head horizontal, lowered or raised), and the system of mirrors 1a, 3, 5, 9, 12, 15 always definitely reflects the rays along the above-described series of optical axes of the view-finder towards the eyes of the user.

The periscopic device which has just been described is combined with a panoramic telescope which is intended to produce an image projected at infinity along the axis GA, of the eye-piece housed in the tube 16.

Figure 2:
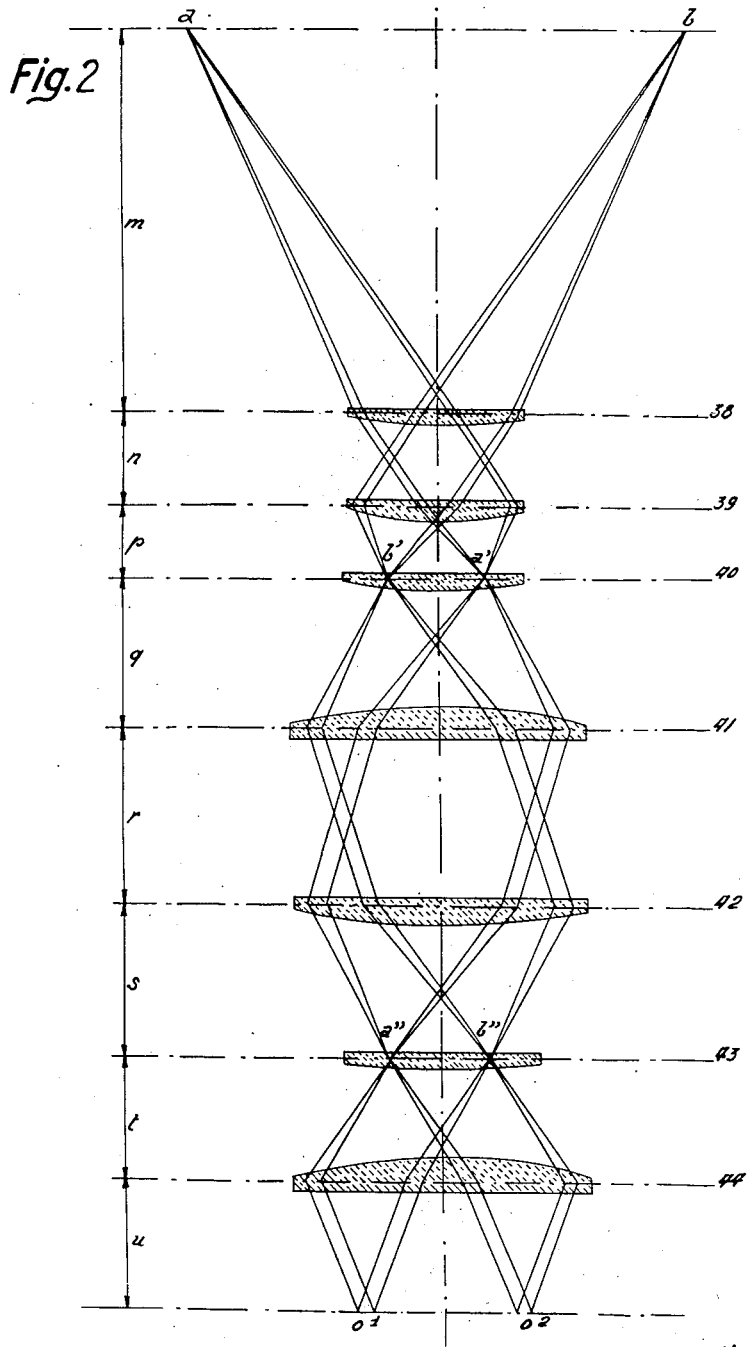
Fig. 2 is the optical diagram of the panoramic telescope.

Said panoramic telescope, combined with the periscope device is preferably constructed as shown in Fig. 2.

According to this example of construction, the telescope comprises an objective formed by plano-convex lenses 38 and 39 (see Figs. 1 and 2). Said objective gives a first real aerial image $a'b'$ (Fig. 2) of the object $ab$. In the plane of the image $a'b'$ is arranged a first collecting lens 40, the function of which is to cause the rays issuing from the objective (38, 39) to converge towards another lens 41 which performs the function of a first collimating lens. Said lens 41 is so arranged that its focal plane coincides with $a'b'$ and consequently with the lens 40. After having passed through this first collimating lens 41, it is obvious that all the rays issuing from the same point of the object will follow a parallel path. A second collimating lens is next provided on the path of the image transmitting rays. The location of lens 42 can vary according to the length that it is desired to give to the system but only within limits, since too great a distance between the lenses 41 and 42 decreases the luminosity of the final image. Lens 42 forms in its focal plane a real aerial image $a''b''$. In the plane of this image is placed a second collecting lens 43, the function of which is to cause the rays which have formed the image $a''b''$ to converge towards the lens 44 of the eye-piece (see Figs. 1 and 2); said lens 43 is so placed that the image $a''b''$ is in its focal plane. The rays which pass through the lens 44 are therefore parallel and the eyes of the observer which are located at O¹ and O² (Fig. 2) see an image which is projected at infinity; the observer has the impression of seeing said image in the actual plane of the lens 44 of the eye-piece.

In Fig. 2, a different scale has been adopted for the lenses which are all plano-convex, and for the distances which must exist between the various lenses, the eyes O¹ and O² of the observer and the object seen at $ab$, namely, all or a part of the observer himself.

By way of a non-limitative example, it will be assumed that $m, n, p, \ldots t, u,$ are the successive distances from the object $ab$ to the lens 38, from the lens 38 to the lens 39, etc., said distances having the following values:

$m = 150$ cm.
$n = 37$ cm.
$p = 30$ cm.
$q = 60$ cm.
$r = 70$ cm.
$s = 60$ cm.
$t = 50$ cm.
$u = 50$ cm.

and that the focal lengths and diameters of the lenses are as follows:

| Lens | Focal length | Diameter |
|---|---|---|
| | Cm. | Cm. |
| 38 | 150 | 7 |
| 39 | 30 | 7 |
| 40 | 50 | 7 |
| 41 | 60 | 16 |
| 42 | 60 | 16 |
| 43 | 144 | 10 |
| 44 | 50 | 16 |

Naturally, these characteristics are only given by way of example; nevertheless, they fulfil all the data of the problem, in particular:

They give the telescope an eye-piece ring of sufficient size for both eyes to be able to operate at the same time (70 mm. minimum);

The location of said eye-piece ring is sufficiently remote from the last lens 44 so that, in the periscope system hereinbefore described, this eye-glass is located at about 40 cm. from the eyes, i. e. outside the field of the camera objective 1.

In Fig. 1, only the lenses 38 and 39 of the objective and the lens 44 of the eye-piece of the telescope have been shown; it is obvious that in the optical path CDEFG of the above described periscope system the lenses 39 to 43 are interposed in such a manner that the eye-piece lens 44 is located between the outlet mirror 15 and the user's eyes.

It should be noted that the tube 16 may extend more or less beyond the lens 44 and form a screen. Said tube is provided with an operating handle 45.

The device such as it has just been described would have a drawback: owing to the rotation, about the axis DE, of the mirror 9 which intercepts the rays reflected by the stationary mirror 5, the final image seen by the user in the eye-piece slope towards the right or towards the left, being inclined in the plane of the lens 44 at an angle equal to the angle of rotation of the tube 6 about the axis DE.

This drawback can be overcome by interposing in the optical path of the periscopic system, preferably between the two lenses 38 and 39 of the objective of the view-finder where the beam is most condensed, a rotatably mounted optical device known in the art as capable of correcting the aberration aforesaid, shown diagrammatically in the drawings as a prism 46 or equivalent device, the speed of rotation of said device being half that of the tube 6 about the axis DE. Under these conditions, the effect of the system of mirrors 5—9 is compensated and eliminated as the tube 6 rotates and the final image seen at 44 remains straight.

The rotational connection between the aberration-correcting optical device 46 and the tube 6 can be effected for example as shown in Fig. 1 by means of an endless cable (or belt) 47 passing over a pulley 48 fixed on the tube 6, and over another pulley 49 mounted on the case 2 containing the aberration-correcting optical device 46, the tubular element 2 being rotatably mounted about the axis BC.

It was stressed hereinbefore that the error due to parallax was fairly small and therefore negligible; it should be noted that it would be possible to eliminate it completely by placing for example the objective 1 behind the mirror 1a, said mirror 1a being so mounted that it is retracted at the instant when the shutter of the objective is actuated (reflex system).

The device which has just been described, and which can be easily made light-proof along the optical path BCDEFA owing to the use of tubular elements, enables the person who wishes to photograph himself to move the view-finder (eye-piece) into any desired position by means of the handle 45 and to preview his image in whatever direction he is looking. When he is satisfied with his image as he sees it in the view-finder, he releases the camera shutter 71 by means of a cable 72 and a knob or treadle 73 or like device with his foot as already known.

Only strictly full-face photos cannot be viewed in the self-photographing view-finder, since in that case the view-finder would be located in the field of the camera objective; this drawback can be readily overcome by combining with the self-photographing view-finder described one auxiliary stationary view-finder which, by means of an auxiliary objective, forms in an opening located close to the objective a reproduction of the image seen by said objective. In the particular case of the full-face photo, the user would therefore not use the movable view-finder and would look directly at the stationary view-finder coupled to the camera.

Figure 3:
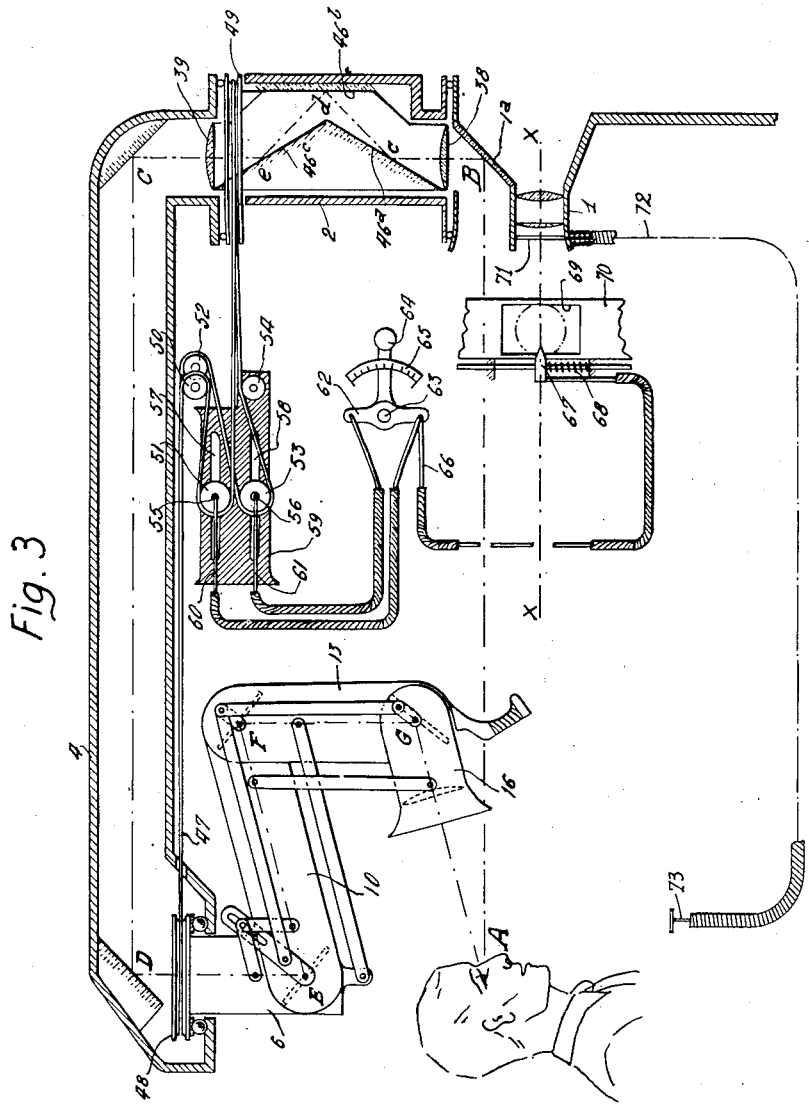
Figure 3 is an elevational view, with parts in section, of a modification according to the invention, of the device shown in Figure 1.

It should be noted that in a telescope of the size contemplated according to the invention, a suitable aberration-correcting prism would be heavy and expensive; consequently it could advantageously be replaced as shown in Fig. 3 by three suitably arranged mirrors 46a, 46b and 46c: the light ray reflected at B on mirror 1a impinges at c on the mirror 46a which is inclined at an angle of 30° from the direction Bc of the ray. The reflected ray cd is reflected at d on the vertical mirror 46b, then at e on the mirror 46c which is also inclined at an angle of 30° from the direction Bc of the ray, and comes out along the axis BceC. It is obvious that the optical path is the same as that produced by an aberration-correcting prism such as illustrated in Fig. 1 and that if the system of mirrors 46a, 46b, 46c is rotated as a unit about the axis BC, the pencils of rays coming out at C will rotate about their axis over an angle equal to twice the rotation angle of the system.

It should be noted that it is easy to give to the operator, or even the user, the possibility, by means of an independent control, of increasing or decreasing the angle of rotation of the erecting or aberration-correcting optical system, such as the prism or equivalent mirror assemblies respectively described in connection with Figs. 1 and 3, relatively to that of the tube 6 in such a manner as to retain a certain inclination of the image in the view-finder, the artistic effect of which may be appreciated by the user as he looks into the frame of the view-finder. If, furthermore, the action of the operator or of any automatic recording system records the inclination of the image obtained in the view-finder at the instant when the shutter is released, it is an easy matter, when making the final photographic print, to give such print the same inclination and to deliver to the user a photograph which is identical to the inclined image he had before his eyes when he released the shutter.

These results can be obtained, as shown in Fig. 3, by passing one of the sides of the cable 47 which connects the tube 6 to the case 2, by means of pulleys 48 and 49, respectively dependent from said tube and case, over a fixed pulley 50, then over a movable pulley 51 and the other side over a fixed pulley 52, over a movable pulley 53, and then over a fixed pulley 54. The two movable return pulleys 51 and 53 have their shafts 55 and 56 guided in grooves 57 and 58 of a stationary support 59 and are urged towards the left in Fig. 3 by cables or other flexible connections 60, 61 in flexible sheaths, said cables being connected to the two ends of an equalizer bar 62. Said equalizer bar is oscillatably mounted about a fixed spindle 63 and is secured to a lever 64 moving in front of a dial 65. Furthermore, the equalizer bar 62 is connected by a cable 66 in a flexible sheath to a pointer 67 which is movable against the action of a retracting spring 68 in front of an opening 69 behind which passes the film or the like 70 of the camera. In Fig. 3 the pointer 67, the opening 69 and the film 70 have been projected flat in front of the objective 1 for greater clearness, but, of course, they are combined with said objective.

It will immediately be understood that by actuating the lever 64, it is possible to shift one of the return pulleys 51 and 53 towards the right and the other towards the left (in Fig. 3), thereby slowing down or accelerating the rotation of the prism 46 (Fig. 1) or of the equivalent mirrors 46a, 46b, 46c (Fig. 3) relatively to that of the tube 6 and consequently enabling a more or less inclined image to be seen in the eye-piece. Simultaneously the pointer 67 moves in front of the opening 69 and produces on the edge of the photographic negative after developing, a mark the position of which varies with the inclination of the subject in the view-finder. By using said mark for the orientation of the positive print relatively to the negative, it is possible to reproduce the photograph on said positive with the same inclination as that of the image seen by the subject in the view-finder at the instant when he released the shutter.

In Fig. 3, it has been assumed that the subject wishes to photograph himself full-face, with the head raised, so as to show a second position of the periscope device, but of course, the device enables the subject to assume any desired position.

This invention is in no way limited to the embodiments illustrated and described which have only been chosen by way of example.

Having now described my invention what I claim as new and desire to secure by Letters Patent is:

1. In combination with a camera, a self-posing device comprising a finder the optical axis of which is close to and parallel with the optical axis of the camera, a rotatable periscopic structure having a vertical axis of rotation intersecting the optical axis of said camera, an eye-piece suspended from said rotatable periscopic structure and having its optical axis intersecting said vertical axis substantially at the point of intersection of said vertical axis with the optical axis of said camera; fixed reflecting surfaces directing the light rays from said finder to said vertical axis; movable light reflecting surfaces carried by and bodily rotatable with said periscopic structure, said movable reflecting surfaces transmitting through said periscopic structure the light rays from said vertical axis into said eye-piece in all angular positions of said periscopic structure; light refracting means disposed in the path of the light rays and forming with said finder and said eye-piece a panoramic telescope; rotatable auxiliary image erecting optical means inserted in the path of the light rays through said fixed reflecting surfaces; means for rotating said rotatable auxiliary optical means in response to a rotation of said rotatable periscopic structure and to cause said rotatable auxiliary optical means to correct at least partially the inclination of the image given by said panoramic telescope; and control means for altering the rotation of said auxiliary optical means relatively to said periscopic structure so as to retain an inclination of the image given by the self-posing device.

2. In combination with a camera, a self-posing device as claimed in claim 1, further comprising a pointer movable in an opening of the camera and means for connecting said pointer to said control means so as to obtain on the photographic negative a mark whose position is variable proportionally to the inclination given to the image in the self-posing device.

3. In combination with a camera, a self-posing device comprising a first tubular element located close to said camera and disposed substantially at right angle to the optical axis of said camera; a first stationary mirror disposed between one end of said first tubular element and said camera and adapted to reflect into said first tubular element light rays from a subject posing before said camera; a second stationary tubular element substantially parallel with the optical axis of said camera and intersecting said first tubular element at the other end thereof; a second stationary mirror disposed at the junction of said first and second tubular elements and adapted to reflect the light rays from said first tubular element into said second tubular element; a third rotary tubular element intersecting at one of its ends said second tubular element and having its axis of rotation intersecting and substantially perpendicular to the optical axis of said camera; a third stationary mirror located at the junction of said second stationary and third rotary tubular elements and adapted to reflect the light rays from said second tubular element into said third tubular element substantially along the axis thereof; a fourth oscillating tubular element having one end pivotally mounted on the other end of said third tubular element about a pivoting axis perpendicular to the axis of rotation of said third element; a fifth oscillating tubular element having one end pivotally mounted on the other end of said fourth element and a sixth oscillating tubular element having one end pivotally mounted on the other end of said fifth element about pivoting axes perpendicular to the axis of rotation of the third element; three oscillating reflecting mirrors respectively located at said three pivoting axes of said fourth, fifth and sixth oscillating tubular elements; connecting means between said third rotary element and said fourth, fifth and sixth oscillating elements and so disposed and arranged that, during the oscillations of said fourth oscillating element about its said pivoting axis, said third and fifth elements remain parallel to each other and said fourth and sixth elements remain parallel to each other; connecting means between said three oscillating reflecting mirrors and disposed and arranged to maintain the surface of each of said mirrors perpendicular to the bisector of the angle formed by the longitudinal axes of any two of said third, fourth, fifth and sixth tubular elements which are adjacent whereby said mirrors reflect the light rays from the axis of rotation of the third element successively substantially along the longitudinal axes of said oscillating elements, and refracting means inserted in the path of the light rays along said tubular elements and forming a panoramic telescope.

4. In combination with a camera, a self-posing device comprising a finder the optical axis of which is close to and parallel with the optical axis of said camera; a rotatable periscopic structure having a vertical axis of rotation intersecting the optical axis of said camera; an eye-piece suspended from said rotatable periscopic structure and having its optical axis intersecting said vertical axis substantially at the point of intersection thereof with the optical axis of said camera; fixed reflecting surfaces directing the light rays from said finder to said vertical axis; movable light reflecting surfaces carried by and bodily rotatable with said periscopic structure, said movable reflecting surfaces transmitting through said periscopic structure the light rays from said vertical axis into said eye-piece in all angular positions of said periscopic structure; light refracting means disposed in the path of the light rays and forming with said finder and said eye-piece a panoramic telescope; a rotatable auxiliary image-erecting structure in the path of the light rays through said fixed reflecting surfaces; a light reflecting, image erecting unit comprising three mirrors and carried in said rotatable auxiliary structure; two pulleys carried respectively by said auxiliary rotatable structure and rotatable periscopic structure; an endless member connecting said pulleys, said auxiliary rotatable structure and rotatable periscopic structure, said endless member being disposed to rotate said auxiliary structure in response to the rotation of said periscopic structure whereby said unit comprising said three mirrors erects the image given by said panoramic telescope; two movable return pulleys disposed on two strands of said endless member; and a control member for shifting said return pulleys in opposite directions to alter the ratio of angular rotation between said periscopic and auxiliary structures.

5. In combination with a camera, a self-posing device comprising a finder the optical axis of which is close to and parallel with the optical axis of the camera; a rotatable periscopic structure having a vertical axis of rotation intersecting the optical axis of said camera; an eye-piece suspended from said rotatable periscopic structure and having its optical axis intersecting said vertical axis substantially at the point of intersection of said vertical axis with the optical axis of said camera; fixed reflecting surfaces directing the light rays from said finder to said vertical axis; movable light reflecting surfaces carried by and bodily rotatable with said periscopic structure, said movable surfaces transmitting through said periscopic structure the light rays from said vertical axis into said eye-piece in all angular positions of said periscopic structure; refracting means inserted in the path of the light rays and forming with said finder and said eye-piece a panoramic telescope; a rotatable auxiliary structure on the path of the light rays through said fixed reflecting surfaces; two pulleys carried respectively by said auxiliary rotatable structure and rotatable periscopic structure; an endless member for connecting said pulleys; and a light reflecting unit comprising three mirrors carried in said rotatable auxiliary structure and adapted to erect the image formed in said eye-piece at all angular positions of said periscopic structure.

6. In combination with a camera, a self-posing device comprising: a finder, the optical axis of which is close to and parallel with the optical axis of said camera; a rotary deformable periscopic structure including adjacent tubular sections consisting of a vertical swivel section, an intermediate section, a connecting section and a terminal section; parallel pivot connections in and between each of said sections and the adjacent section; a first linking means pivotally supported at its ends on said swivel section and connecting section respectively by one of said pivot connections and on said intermediate section by two said parallel pivot connections, thereby forming a first deformable parallelepiped; a second linking means pivotally supported at its ends on said intermediate section and terminal section respectively by one of said pivot connections and on said connecting section by two said parallel pivot connections, thereby forming a second deformable parallelepiped; whereby said connecting section remains parallel to said swivel section, and said terminal section with said intermediate section; said terminal section having its geometrical axis passing substantially through the user's eyes in all positions of said periscopic structure; an eye-piece located in said terminal section coaxially therewith; optical reflecting means disposed between said finder and said eye-piece and directing the light from the finder to said eye-piece; said reflecting means embodying fixed reflecting means and movable reflecting means within said periscopic structure adjacent said pivot connections; and means connecting said tubular sections with said movable reflecting means to constantly orient the latter at right angles with the bisectors of the angles formed by adjacent sections respectively.

7. In a combination as claimed in claim 6, rotatable image erecting optical means disposed on the path of the light rays between said finder and said eye-piece; movable endless connecting means engaging said image erecting means and said swivel section, and adapted to rotate said image erecting means in response to the angle of rotation of said swivel section; a pointer movable in an opening of said camera and disposed to register its position on the film in said camera; movable control means on said endless connecting means, and adapted to cause variations of the angle of rotation of said swivel section relative to the angle of rotation of said image erecting means in response to the inclination of the image in said self-posing device; and connections between said control means and said pointer, whereby said pointer moves in said opening in response to said variations proportionately to said inclination.

JEAN THEODORE FOUFOUNIS.

REFERENCES CITED

The following references are of record in the file of this patent:

UNITED STATES PATENTS

| Number | Name | Date |
|---|---|---|
| 815,657 | Swasey | Mar. 20, 1906 |
| 1,097,635 | Humbrecht | May 26, 1914 |
| 1,102,046 | Hanson | June 30, 1914 |
| 1,479,036 | Fosdick | Jan. 1, 1924 |
| 1,799,767 | Simjian | Apr. 7, 1931 |
| 1,830,770 | Simjian | Nov. 10, 1931 |
| 1,913,793 | Clementi et al. | June 13, 1933 |
| 1,919,642 | Simjian | July 25, 1933 |
| 1,952,337 | Simjian | Mar. 27, 1934 |
| 2,152,726 | Baroni | Apr. 4, 1939 |
| 2,390,516 | Crawford | Dec. 11, 1945 |